(12) United States Patent
Morrell

(10) Patent No.: US 7,398,601 B2
(45) Date of Patent: Jul. 15, 2008

(54) CARPENTER'S PITCH SQUARE

(76) Inventor: Michael F. Morrell, 27361 Sierra Hwy., Space #231, Canyon Country, CA (US) 91351

(*) Notice: Subject to any disclaimer, the term of this patent is extended or adjusted under 35 U.S.C. 154(b) by 134 days.

(21) Appl. No.: 11/422,269

(22) Filed: Jun. 5, 2006

(65) Prior Publication Data
US 2007/0277387 A1    Dec. 6, 2007

(51) Int. Cl.
*B43L 7/027* (2006.01)
(52) U.S. Cl. ........................................................ 33/429
(58) Field of Classification Search ............. 33/429, 33/484
See application file for complete search history.

(56) References Cited

U.S. PATENT DOCUMENTS

| 304,601 A | | 9/1884 | Boettcher |
| 893,085 A | * | 7/1908 | Loughborough ............ 33/27.03 |
| 1,409,723 A | * | 3/1922 | Jacob ............................ 33/1 A |
| 1,904,234 A | * | 4/1933 | Hoskin et al. ................ 378/163 |
| 2,170,916 A | * | 8/1939 | Schweitzer et al. .......... 277/326 |
| 2,371,485 A | * | 3/1945 | Waldman ...................... 33/565 |
| 2,655,729 A | | 10/1953 | Panske |
| 4,513,510 A | | 4/1985 | Swanson |
| D364,574 S | | 11/1995 | Utz et al. |
| 5,704,263 A | * | 1/1998 | Swanberg ........................ 83/13 |
| 5,727,325 A | * | 3/1998 | Mussell ........................ 33/429 |
| D416,501 S | | 11/1999 | DiGangi et al. |
| 6,029,360 A | | 2/2000 | Koch |
| D422,225 S | | 4/2000 | DiGangi et al. |
| 6,122,834 A | | 9/2000 | Rester |
| 6,199,288 B1 | * | 3/2001 | Gregory ........................ 33/484 |
| 6,230,416 B1 | | 5/2001 | Trigilio |
| 6,266,889 B1 | * | 7/2001 | Boyce .......................... 33/484 |
| 6,688,014 B1 | * | 2/2004 | Allemand .................... 33/474 |
| 6,868,616 B2 | * | 3/2005 | Allemand .................... 33/476 |
| D512,332 S | | 12/2005 | Graham |
| 2005/0283987 A1 | | 12/2005 | Nash |
| 2006/0037206 A1 | | 2/2006 | Sanders |

FOREIGN PATENT DOCUMENTS

GB    2170916 A    8/1986

* cited by examiner

*Primary Examiner*—Christopher W Fulton
(74) *Attorney, Agent, or Firm*—Kelly Lowry & Kelley, LLP

(57) ABSTRACT

A carpenter's square includes a triangular base having first and second sides joined to form a right angle. A first elongated slot is disposed within the base parallel to a third side thereof; and a pin is selectively positionable along the length of the slot. The pin provides a mechanism for fixing the base in a specific orientation relative to an edge of an object when the pin is in a locked position within the slot.

17 Claims, 9 Drawing Sheets

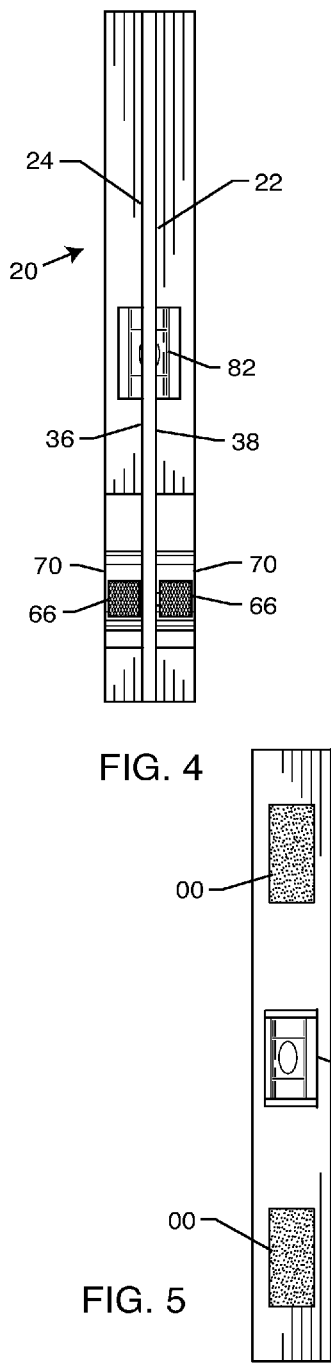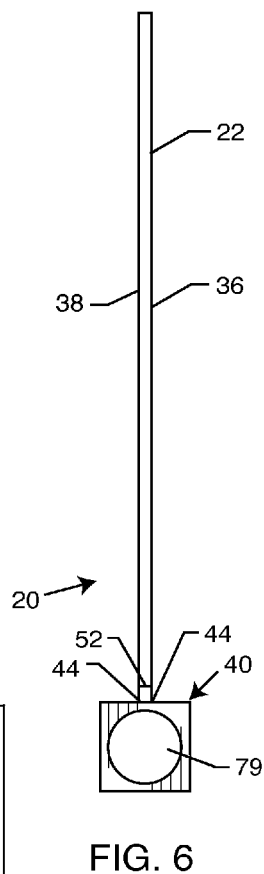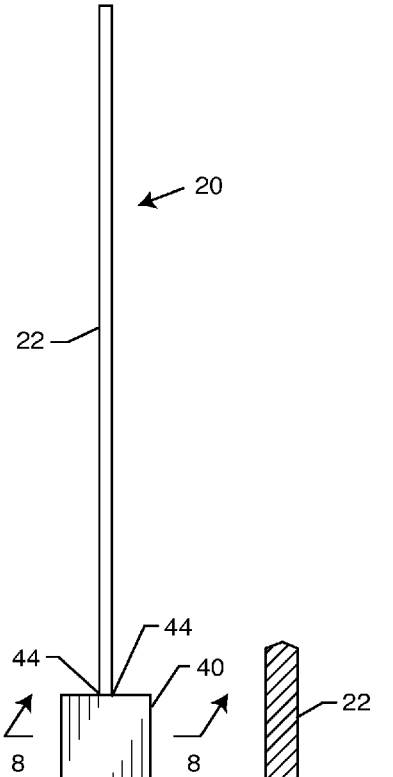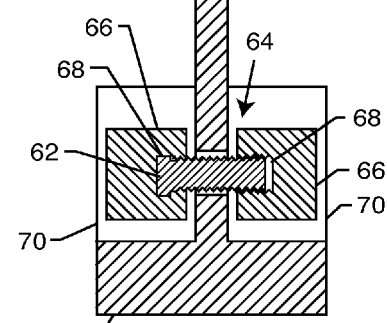
FIG. 4
FIG. 5
FIG. 6
FIG. 7
FIG. 8

CARPENTER'S PITCH SQUARE

BACKGROUND OF THE INVENTION

The present invention relates generally to measuring tools. More particularly, the present invention relates to a square having a mechanism for fixing the square in a particular orientation.

Carpenter's squares, sometimes referred to as SPEED squares, framing squares, rafter squares, rafter angle squares and the like, are used for a variety of tasks by carpenters, electricians, plumbers and other similar craftsmen. These squares typically have a main body with three sides, two of which meet at a right angle. The sides are straight edges marked with rulers and lay out lines. The rulers are used to mark out rafter layouts straight line cuts, angle line cuts, etc. Such squares are used for erecting roofs, in which common rafters, hip rafters, valley or jack rafters, and cornices are cut with the proper plumb, heel and side cuts so that the rafters can be put in place with the proper pitch and length.

More particularly, these squares are used for generating straight lines. However, these squares have certain disadvantages. It is not always easy to use such squares to generate straight lines, especially in cramped areas where it is difficult to be in a position to view the markings on the square in order to orient the square in a desired manner. It is also difficult to determining straight lines at long distances, up heights such as on roofs or ceilings, across spaces where there are encumbrances or across areas having depths which cannot be traversed (such as roofs only having the end rafters in place).

Various attempts have been made to overcome the problems associated with these squares. For example, U.S. Pat. No. discloses a square connected to a layout bar to provide for repeated markings of predetermined angles. However, the layout bar needs to be mechanically connected to the square which can result in misalignment and requires multiple adjustment points in order to obtain a desired angle. In another example, U.S. Pat. No. 6,230,416 discloses a laser square for generating straight lines. However, the laser square can not be locked into a specific orientation and requires visual access to each location at which the square is positioned in order to determine the proper orientation of the square.

Accordingly, there is a need for a square that can be locked into a particular angle/pitch in a simple yet elegant manner. There is also a need for a square that does not rely on a user being able to visually determine the angle pitch at a particular location in order to properly mark/scribe at that location. There is a need for an inexpensive, simple addition to the square that brings greater simplicity and ease of use to both the professional and handyman users. The present invention fulfills these needs and provides other related advantages.

SUMMARY OF THE INVENTION

The present invention resides in a carpenter's square having a triangular base having first and second sides joined to form a right angle. A first elongated slot is located within the base parallel to a third side thereof. A pin is selectively positionable along the length of the slot. The pin provides a mechanism for fixing the base in a specific orientation relative to an edge of an object when the pin is in a locked position within the slot.

The base is pivotable about the pin when the pin abuts against the edge of the object in a use configuration. The base includes a plurality of angle indicia associated with the elongated slot with which the pin is alignable in order to position the square in a specific orientation relative to the edge of the object.

The square includes a bar connected to the base along the first side. An intersection of the base and bar defines a junction for receiving the edge of the object. The bar extends perpendicularly outward from upper and lower surfaces of the base. The bar includes a recess into which one end of the slot extends and the pin is disposed within the recess in a non-use configuration. The bar includes a pencil sharpener, a magnet for removably attaching the bar to a metallic surface, and/or a level for determining a pitch of a surface relative to a level position.

The square also includes a lock for holding the pin in a selected position within the slot. The lock comprises a knob head moveable relative to the pin for selectively engaging the base.

A scribe hole is disposed between the second and third sides. The scribe hole includes a first set of scribe holes extending generally parallel to the second side, and a second set of scribe holes extending generally parallel to the third side.

In another embodiment, similar to the embodiment described above, the square includes a second elongated slot parallel to the first elongated slot.

The lockable pin transforms the square into a fully adjustable square that now has versatility that enables a user to perform tasks that could not be done before with such ease. The lockable pin transforms the square into a fixed jig in order to do multiple and repetitive markings with not only speed, but repetitive accuracy that does not exist with conventional squares. The lockable pin allows the user to use the square in positions that are non-surface oriented (i.e., the square is able to perform squaring positions that are non-pivot oriented as well as pivot oriented). The lockable pin allows the user to scribe much more efficiently and widens the area that can be scribe in addition to delivering a much more accurate and simpler way to scribe. The recess in the bar allows the user to slide the pin into the recess so that the square can be used in the pivot positions at all times and allows the user the option of the pin when needed and use of the square as a conventional square when the pin is not needed. The lockable pin also allows the user to copy any existing angle as a template once the pin is in a locked position and then transfer the angle onto another location without reliance on human memory or pivot markings.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 4 is a top plan view taken generally along line 4-4 of FIG. 3;

FIG. 5 is a bottom plan view taken generally along line 5-5 of FIG. 3;

FIG. 6 is a side view taken generally along line 6-6 of FIG. 3;

FIG. 7 is another side view taken generally along line 7-7 of FIG. 3;

FIG. 8 is a sectional view taken generally along line 8-8 of FIG. 6;

DETAILED DESCRIPTION OF THE PREFERRED EMBODIMENTS

Figure 1:
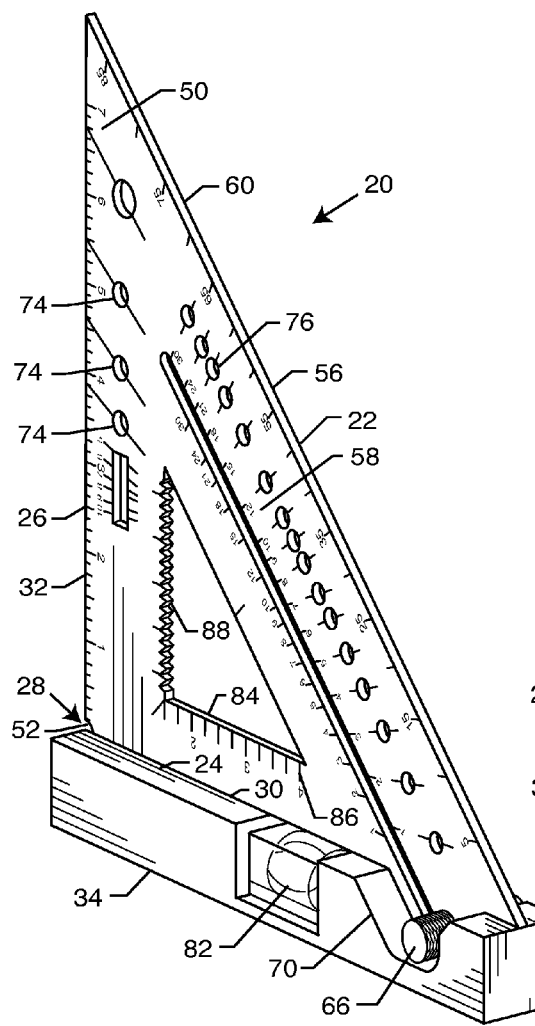
FIG. 1 is a left side perspective view of a square embodying the present invention, showing a knob within the slot in a non-use configuration.
Figure 2:
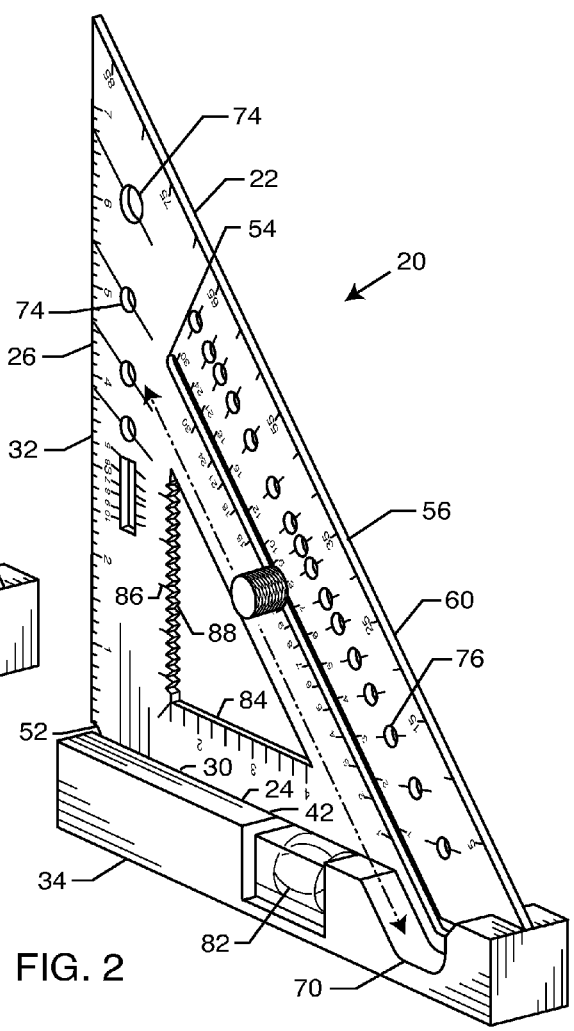
FIG. 2 is another perspective view of the square of FIG. 1, showing the knob in a use configuration.
Figure 3:
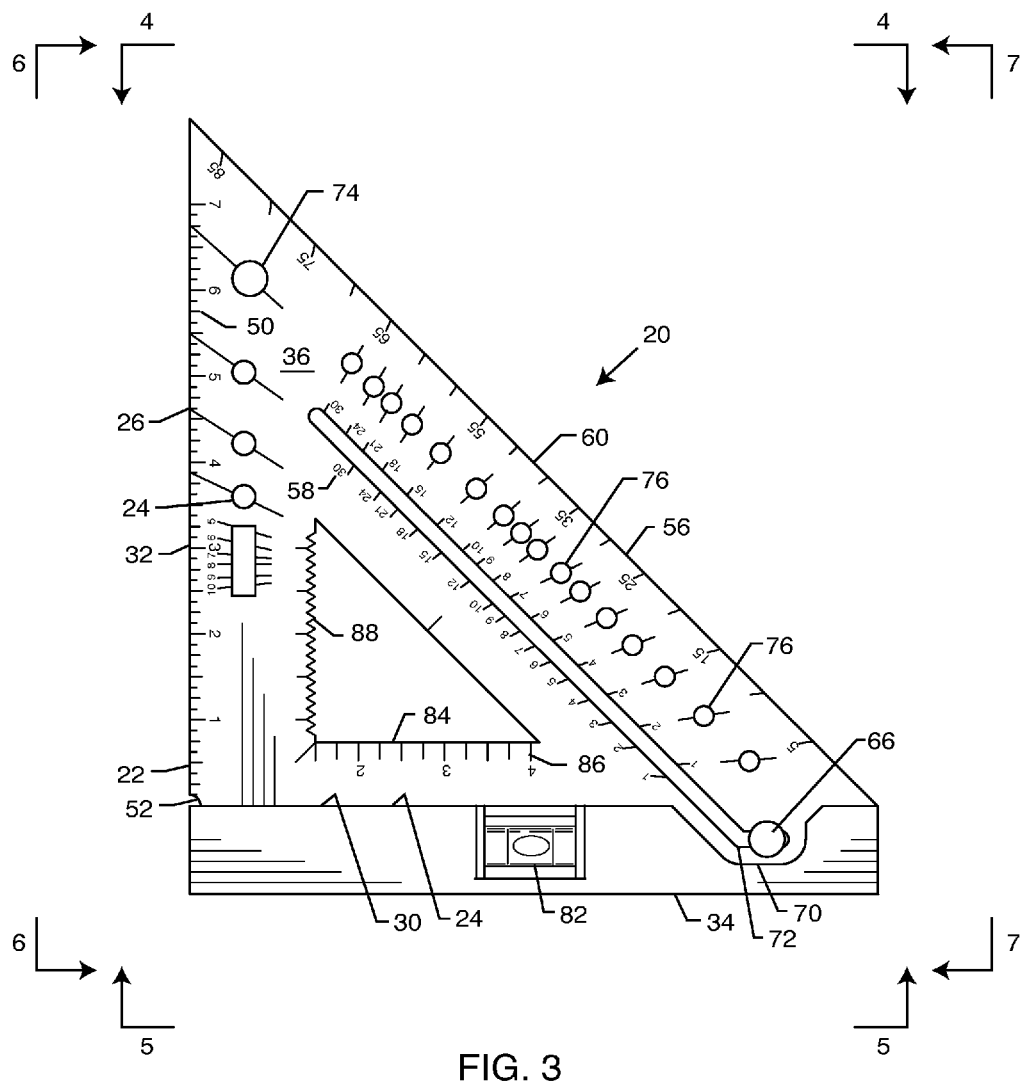
FIG. 3 is an elevation view of the square of FIG. 1.
Figure 9:
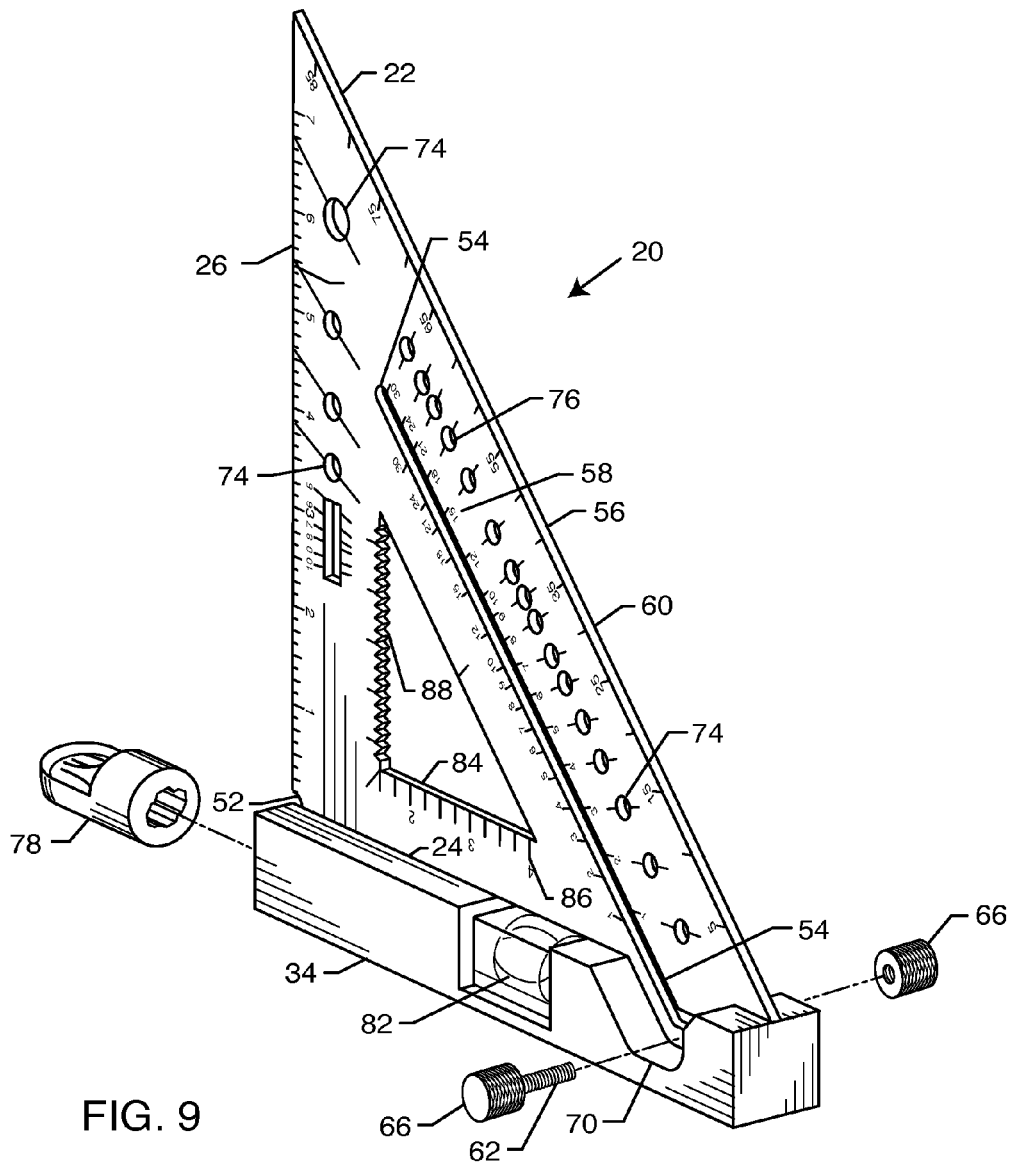
FIG. 9 is a partially exploded view of the square of FIG. 1.
Figure 10:
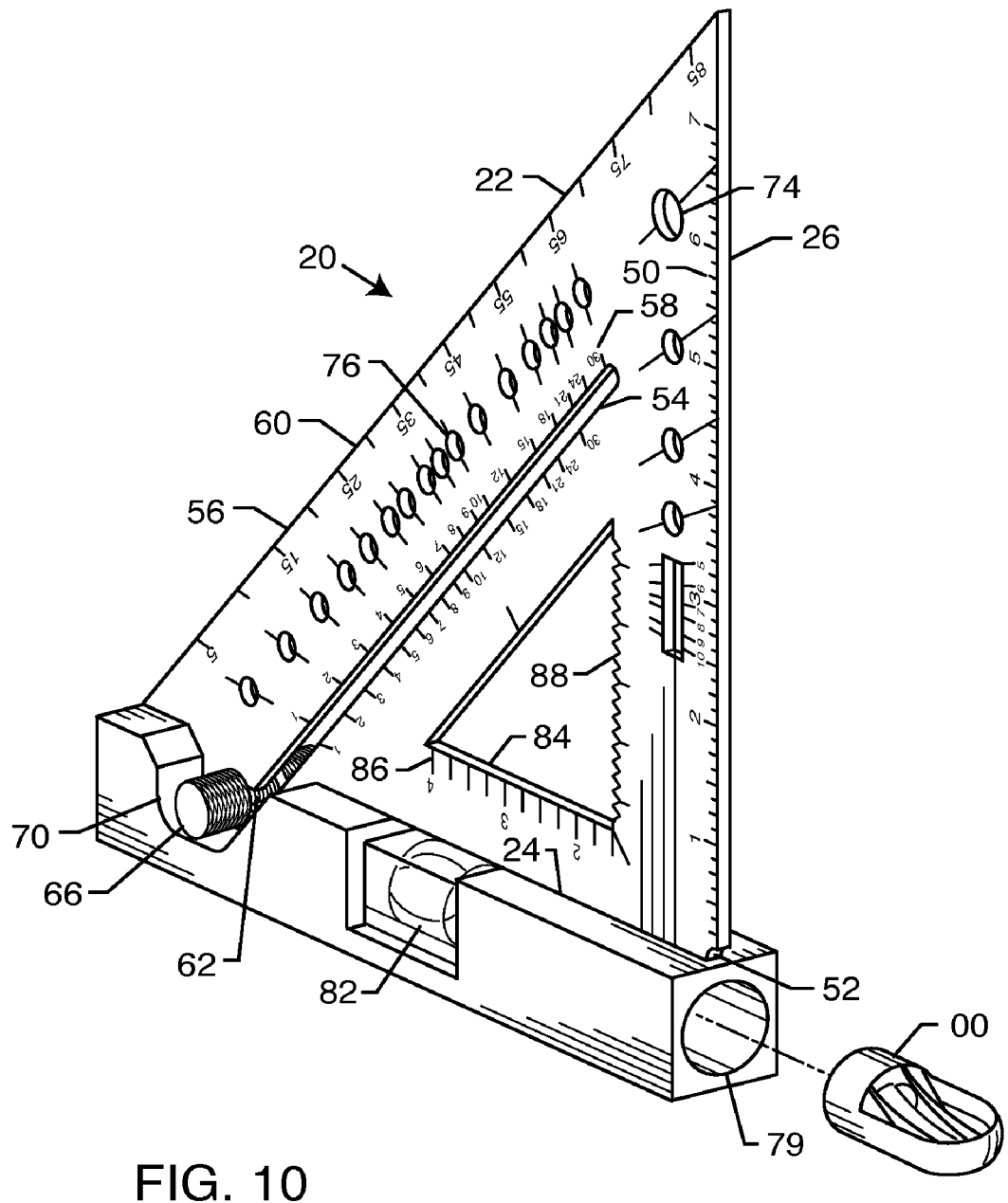
FIG. 10 is a partially exploded, right side perspective view of the square of FIG. 1.

As shown in the figures for purposes of illustration, the present invention is concerned with a square 20, 90 for use in carpentry, plumbing, electrical work or the like. The present invention provides a number of improvements that include accurately scribing sets into locked pitch and angle positions. The square can now be placed on work that is not a surface, mark level cuts on rafters, and mark multiple angles without pivot. The square is now adjustable. The square includes features such as a pencil sharpener, a magnet for steel framing. The square can be used as a saw guide in an angle position.

In an embodiment of the invention, the square 20 (FIGS. 1-13) includes a triangular base 22 having first and second straight sides 24, 26 joined to form a right angle at a corner 28. The first and second sides 24, 26 define straight edges 30, 32 of the base 22.

The square 20 includes a bar 34 connected to the base 22 along the first side 24. The bar 34 extends perpendicularly outward from first and second surfaces 36, 38 on opposite sides of the base 22 to define a T-bar portion 40 having a straight edge 42 and a junction 44 at an intersection of the base 22 and bar 30 for receiving an edge 46 of an object 48.

The straight edge 32 of the second side 26 is perpendicular to the straight edge 42 of the T-bar portion 40, and the T-bar portion 40 is perpendicular to the body 22. The straight edge 32 of the second side 26 includes indicia 50 that allow the straight edge 32 to serve as a ruler for measuring distance. The indicia 50 may be in various forms including, without limitation, inch or other English unit distance markings, centimeter or other metric unit distance markings, or the like. The T-bar straight edge 42 and the edge 32 of the second side 26 meet at right angles at the corner 28 to define a pivot or heel recess 52 of the square 20.

An elongated slot 54 is provided within the base 22 parallel to a third or hypotenuse side 56 of the base 22. The base 22 includes a plurality of angle indicia 58 (e.g., a scale for common top cuts and a scale for hip-valley cuts provided on both sides of the slot 50). An edge 60 of the hypotenuse side 56 interconnects the free ends of the T-bar straight edge 42 and the second straight edge 32.

A pin 62 is selectively positionable along the length of the slot 54. The pin 62 provides a means for fixing the base 22 in a specific orientation relative to the edge 46 of the object 48 when the pin 62 is in a locked position within the slot 54. The square 20 includes a lock 64 for holding the pin 62 in a selected position within the slot 54. The lock 64 comprises a pair of knob heads 66. Each knob head 66 is moveable relative to the pin 62 for selectively engaging the base 22. Each knob head 66 has a bore 68 for threaded engagement with a respective end of the pin 62. Turning the knob head 66 in one direction moves the knob head 66 away from the base 22 while turning the knob head 66 in an opposite direction moves the knob head 66 closer to the base 22. Each knob head 66 abuttingly engages a respective surface 36, 38 of the base 22 in the locked position such that the base 22 is disposed between each knob head 66 in the locked position and engaged therewith. In the locked position, the pin 62 is not able to move along the length of the slot 54. The base 22 is pivotable about the pin 62 when the pin 62 abuts against the edge 46 of the object 48 in a use configuration. The pin 62 is selectively alignable with the plurality of angle indicia 58 positioned along the length of the elongated slot 54.

The bar 34 includes a knob niche or recess 70 into which an angled end 72 of the slot 54 extends. The end 72 of the slot 54 is angled in order to tuck the pin 62 and knob head 66 into the recess 70.

The base 22 a first set of scribe holes 74 extending generally aligned, parallel to the second side 26, and a second set of scribe holes 76 extending generally aligned, parallel to the third side 56. The scribe holes 74, 76 are disposed between the second and third sides 26, 56 of the base 22.

The bar 34 includes a number of components including, without limitation, a pencil sharpener 78 (removable from a recess 79 in the bar 34 and positionable therein), a magnet 80 for removably attaching the bar 34 to a metallic surface, and/or a level 82 for determining a pitch of a surface relative to a level position.

A triangle-shaped cut-out 84 is provided within the base 22 for reducing the weight of the square 20 as well as providing additional indicia 86 disposed on sides of the cut-out 84 adjacent edges of the cut-out 84 to serve as scales providing inch or other English unit distance markings, centimeter or other metric unit distance markings, or the like. At least one edge of the cut-out 84 includes scribe notches 88.

Figure 14:
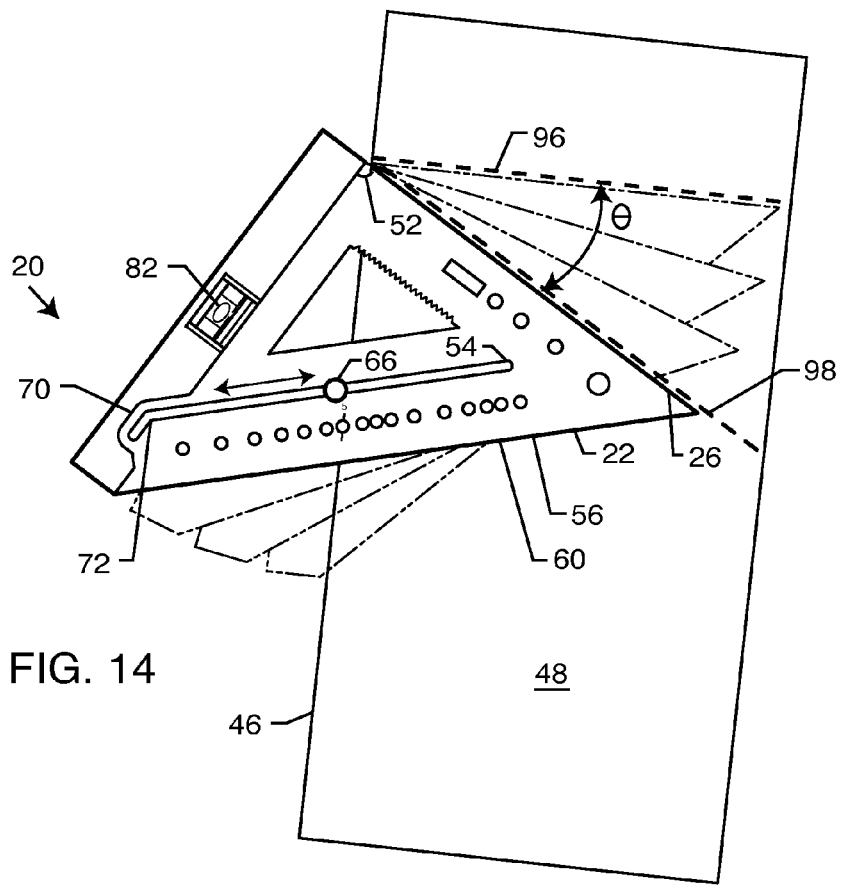
FIG. 14 is a top plan view of the square and object of FIG. 11, with another line marked on the surface of the object, after the knob was moved into a use configuration.
Figure 15:
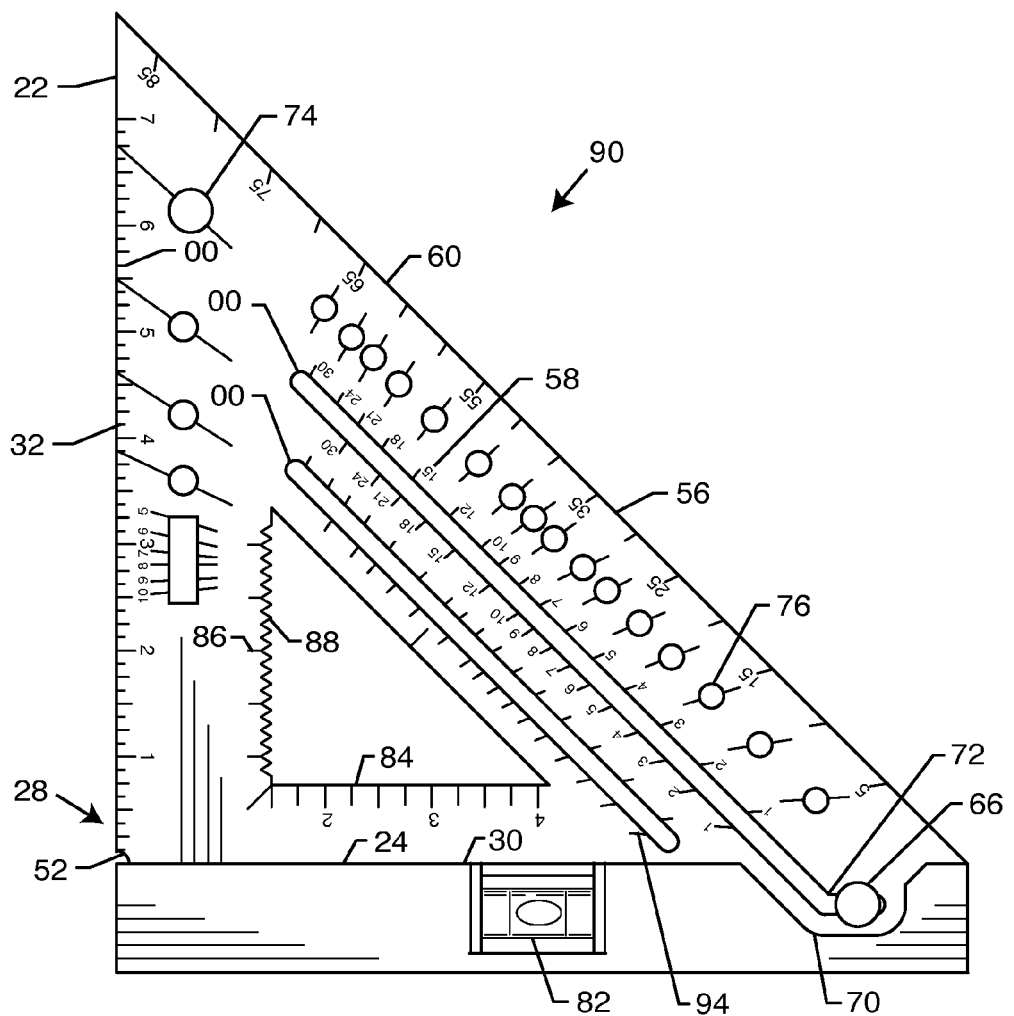
FIG. 15 is an elevation view of another square embodying the present invention.
Figure 16:
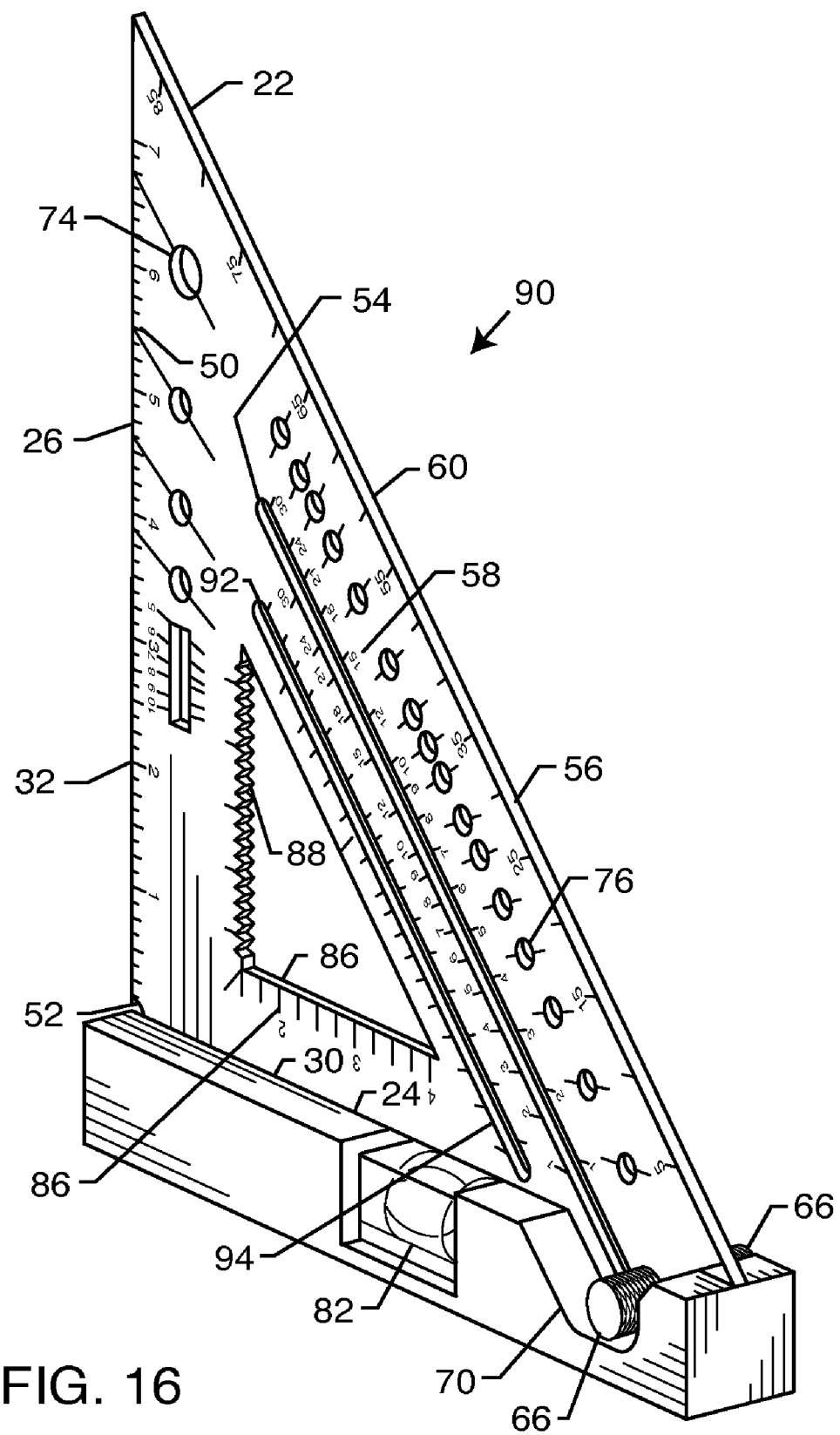
FIG. 16 is a left side perspective view of the square of FIG. 14.

In another embodiment of the invention, the square 90 (FIGS. 14 and 15), virtually identical to the square 20, includes a second elongated slot 92 parallel to the first elongated slot 54. Indicia markings 94 are associated with opposite sides of the second elongated slot 92.

Figure 11:
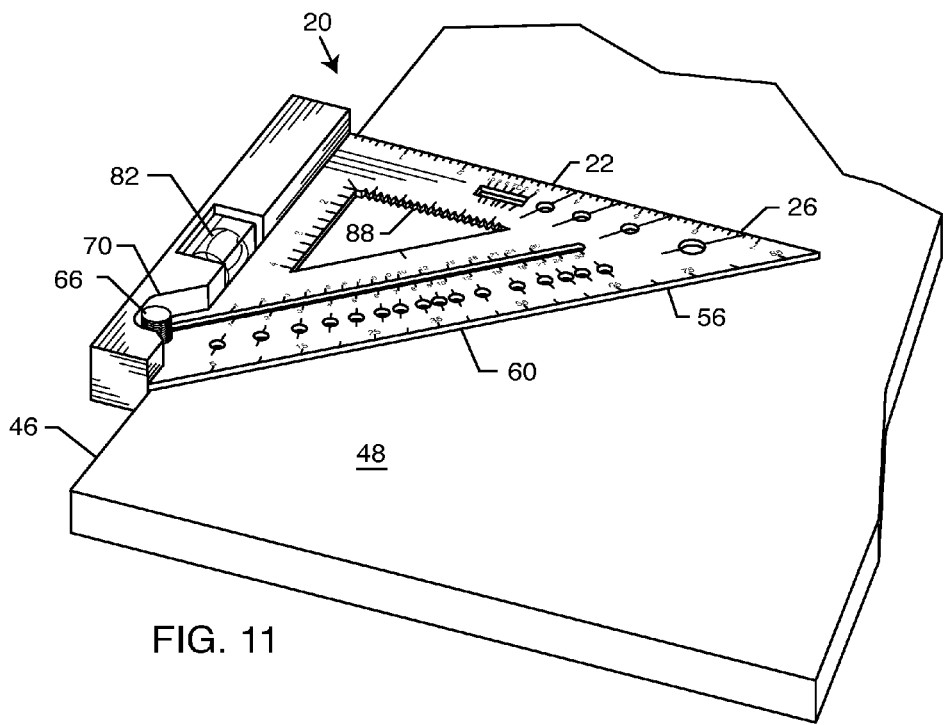
FIG. 11 is a perspective view of a junction of the square of FIG. 1 resting against an edge of an object, with the knob in a non-use configuration, allowing the square to function in a conventional manner.
Figure 12:
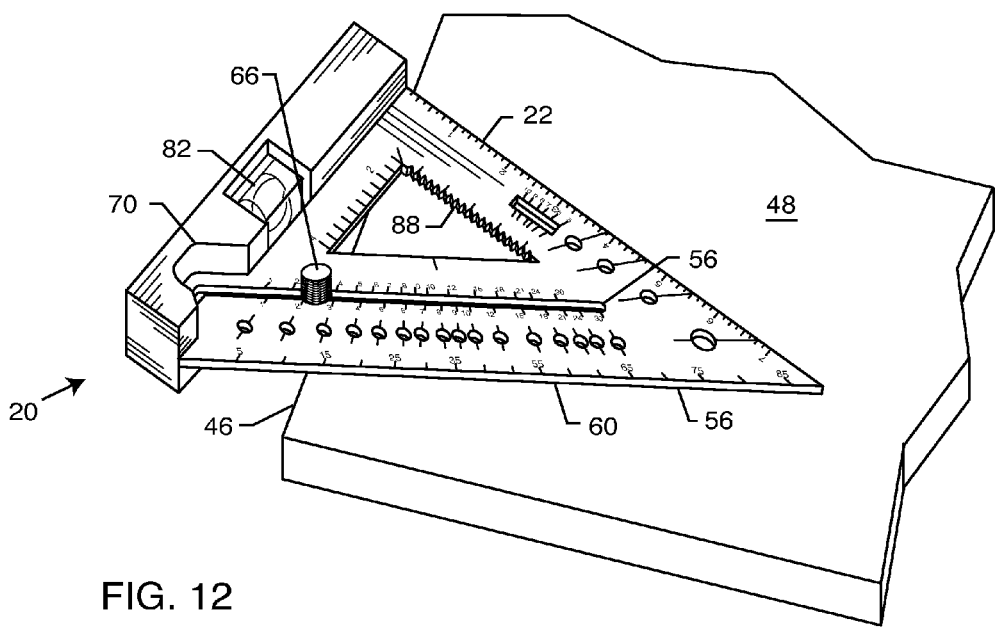
FIG. 12 is a perspective view similar to that of FIG. 1 except that the knob is in a use configuration, allowing the square to function in an unconventional manner with the junction and knob of the square resting against the edge of the object.
Figure 13:
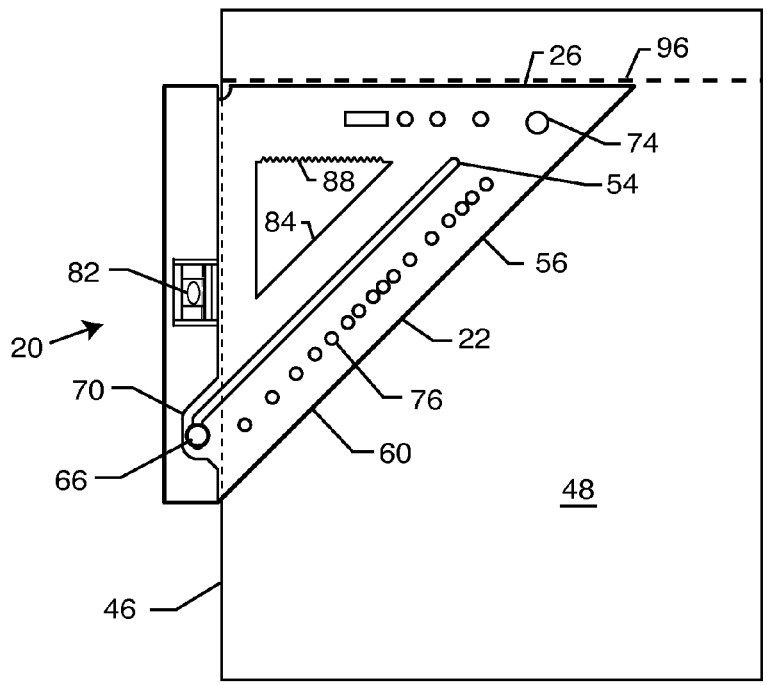
FIG. 13 is a top plan view of the square and object of FIG. 10, with a line marked on a surface of the object.

In operation, the pin 62 is disposed within the recess 70 in a non-use configuration (FIG. 10) and positioned along the slot 54 in a use configuration (FIG. 11). When the pin 62 is in a non-use configuration, the square 20, 90 can still function to provide markings 96 along at least one straight edge (e.g., straight edge 32, as seen in FIG. 12) with the junction 44 of the square 20, 90 abutting against the edge 46 of the object 48. When the pin 62 is positioned along the slot 54 in a use configuration, the pin 62 is aligned with and locked into a particular angle setting θ of the indicia 58 along the slot 54 in order to provide a desired angle θ between the markings 96 made along straight edge 32 in the pin non-use configuration and markings 98 made along the straight edge 32 in the pin use configuration (as seen in FIG. 13) when the pin 62 and pivot recess 52 abut against the edge 46 of the object 48.

In addition to providing an angular displacement functionality to the square 20, 90, as outlined above, the pin 62 allows the user to lock the square 20, 90 into the angle θ setting and then slide the square 20, 90 along the straight edge 46 of the object 48, providing repetitive scribing and marking that are identical each time without reliance on moving the square 20, 90 and re-pivoting the square 20, 90 each time (in a situation that requires multiple squaring with angles or pitches).

The lockable pin also allows the user to use the square 20, 90 in a non-surface oriented squaring task (i.e., without the pin 62, the user has to be in complete eye contact with the square 20, 90, positioned directly over the markings and pivot area of the square 20, 90). Thus, visual pivoting is no longer required. With the pin 62 locked into a position along the slot 54, the user is now able to square pitches and angles that may be hard to reach and also visually see the pivot markings. The user now merely needs to lock the pin 62 into the desired position and then place the square 20, 90 in the desired location in order to make the desired scribing/marking.

In a situation where repetitive scribing/marking must be made between hard-to-reach rafters, the lockable pin 62 provides the user with versatility and ease of marking since adjustment of the square 20, 90 need only be done once, with the square 20, 90 then being lifted/moved to the next location with the square 20, 90 still locked into the desired pin use configuration. As the pin 62 in the locked position holds the square 20, 90 at a fixed angle/pitch, the pin 62 allows the user to find a precise angle/pitch and then lock the square 20, 90 into that angle/pitch without reliance on memory or being able to visually confirm the angle/pitch.

The lockable pin 62 allows a much quicker and efficient way to find intercepting angles off of existing rafters or pitches by using the level bubble 82 from the top bar 34 of the square 20, 90 when the pin 62 and recess 52 abut against an existing angle or rafter edge. The pin 62 is slid along the slot 54 until the level bubble 82 indicates that a level position has been obtained. The pin 62 is then locked into position, removed from the existing angle or rafter edge, and the intercepting angle determined by the user looking at the indicia 58 associated with the slot 54. This reduces the need for the user to place himself or herself into a visual surface position to find those angles.

The lockable pin 62 allows the user to now be able to scribe long distances, completely accurately, by locking the pin 62 into a desired position along the slot 54, inserting a pencil into a desired scribe hole 74, 76 and sliding the square 20, 90 (the pin 62 and recess 52 abutting against an existing angle or rafter edge) along the existing angle or rafter edge.

The first and second sets of scribing holes 74, 76 also allow the user a much more accurate way to mark the scribing because the pencil or other scribing device is now in a fixed hole and cannot graze off the surface being marked as the square 20, 90 slides along an edge. The additional slot 92 and/or holes 74, 76 allow the user to visually see the edge underneath the square 20, 90 for situations that may occur if the user is in a position where the corresponding pitch may not be visible because the user's hand is positioned over the pin 62, blocking the user's ability to see the indicia 58 the pin 62 is aligned with, the indicia 94 associated with the slot 92 and/or scribing holes 74, 76 corresponding to the indicia 58 of the slot 54. Additionally, the added holes 74, 76 allow the user to use the pin 62 as an additional pivot point (once the pin 62 is locked into a desired pitch or angle) as the locked pin 62 allows a very quick pivot back into the bottom pivot point (i.e., pivot 52), providing the user a very versatile way to mark the level angle of the corresponding pitch that the pin 62 is locked into, thus making it very easy and uncomplicated to mark seat cuts on rafters.

The above-described embodiments of the present invention are illustrative only and not limiting. It will thus be apparent to those skilled in the art that various changes and modifications may be made without departing from this invention in its broader aspects. Therefore, the appended claims encompass all such changes and modifications as falling within the true spirit and scope of this invention.

What is claimed is:

1. A carpenter's square, comprising:
   a triangular base having first and second sides joined to form a right angle;
   a first elongated slot within the base parallel to a third side thereof;
   a pin selectively positionable along the length of the slot, the pin providing means for fixing the base in a specific orientation relative to an edge of an object when the pin is in a locked position within the slot; and
   a bar connected to the base along the first side, wherein an intersection of the base and bar defines a junction for receiving the edge of the object; wherein the bar includes a recess into which one end of the slot extends.

2. The carpenter's square of claim 1, wherein the base is pivotable about the pin when the pin abuts against the edge of the object in a use configuration.

3. The carpenter's square of claim 1, wherein the bar extends perpendicularly outward from upper and lower surfaces of the base.

4. The carpenter's square of claim 1, wherein the pin is disposed within the recess in a non-use configuration.

5. The carpenter's square of claim 1, wherein the bar includes a pencil sharpener, a magnet for removably attaching the bar to a metallic surface, and/or a level for determining a pitch of a surface relative to a level position.

6. The carpenter's square of claim 1, including a lock for holding the pin in a selected position within the slot.

7. The carpenter's square of claim 6, wherein the lock comprises a knob head moveable relative to the pin for selectively engaging the base.

8. The carpenter's square of claim 1, including a scribe hole disposed between the second and third sides.

9. The carpenter's square of claim 8, wherein the scribe hole includes a first set of scribe holes extending generally parallel to the second side, and a second set of scribe holes extending generally parallel to the third side.

10. The carpenter's square of claim 1, includes a second elongated slot parallel to the first elongated slot.

11. The carpenter's square of claim 1, wherein the base includes a plurality of angle indicia associated with the elongated slot.

12. A carpenter's square, comprising:
   a triangular base having first and second sides joined to form a right angle;
   a first elongated slot within the base parallel to a third side thereof;
   a pin selectively positionable along the length of the slot, the pin providing means for fixing the base in a specific orientation relative to an edge of an object when the pin is in a locked position within the slot;
   a bar connected to the base along the first side, wherein an intersection of the base and bar defines a junction for receiving the edge of the object, and the bar extends perpendicularly outward from upper and lower surfaces of the base; and a lock for holding the pin in a selected position within the slot, wherein the lock comprises a knob head moveable relative to the pin for selectively engaging the base;

wherein the base is pivotable about the pin when the pin abuts against the edge of the object in a use configuration;

wherein the bar includes a recess into which one end of the slot extend, and the pin is disposed within the recess in a non-use configuration.

13. The carpenter's square of claim 12, wherein the bar includes a pencil sharpener, a magnet for removably attaching the bar to a metallic surface, and/or a level for determining a pitch of a surface relative to a level position.

14. The carpenter's square of claim 12, including first and second sets of scribe holes disposed between the second and third sides, wherein the first set of scribe holes extends generally parallel to the second side, the second set of scribe holes extends generally parallel to the third side, and the base includes a plurality of angle indicia associated with the elongated slot.

15. The carpenter's square of claim 12, includes a second elongated slot parallel to the first elongated slot.

16. A carpenter's square, comprising:

a triangular base having first and second sides joined to form a right angle;

a first elongated slot within the base parallel to a third side thereof;

a second elongated slot parallel to the first elongated slot;

a pin selectively positionable along the length of the first elongated slot, the pin providing means for fixing the base in a specific orientation relative to an edge of an object when the pin is in a locked position within the slot;

a bar connected to the base along the first side, wherein an intersection of the base and bar defines a junction for receiving the edge of the object, the bar extends perpendicularly outward from upper and lower surfaces of the base, and the base is pivotable about the pin when the pin abuts against the edge of the object in a use configuration; and a lock for holding the pin a selected position within the first elongated slot, wherein the lock comprises a knob head moveable relative to the pin for selectively engaging the base; wherein the bar includes a recess into which one end of the slot extends, and the pin is disposed with the recess in a non-use configuration.

17. The carpenter's square of claim 16, including first and second sets of scribe holes disposed between the second and third sides, wherein the first set of scribe holes extends generally parallel to the second side, the second set of scribe holes extends generally parallel to the third side, the base includes a plurality of angle indicia associated with the elongated slot, and the bar includes a pencil sharpener, a magnet for removably attaching the bar to a metallic surface, and/or a level for determining a pitch of a surface relative to a level position.

* * * * *

UNITED STATES PATENT AND TRADEMARK OFFICE
CERTIFICATE OF CORRECTION

PATENT NO. : 7,398,601 B2 Page 1 of 1
APPLICATION NO. : 11/422269
DATED : July 15, 2008
INVENTOR(S) : Michael F. Morrell It is certified that error appears in the above-identified patent and that said Letters Patent is hereby corrected as shown below:

In Claim 16, column 8, line 13, after the word "pin" insert --in--

Signed and Sealed this

Seventh Day of October, 2008

JON W. DUDAS
*Director of the United States Patent and Trademark Office*